(No Model.)
J. B. ROOT, Dec'd.
H. M. ROOT, Administratrix and W. S. CHURCH, Administrator.
SPIRALLY WELDED TUBE.
No. 376,680.              Patented Jan. 17, 1888.
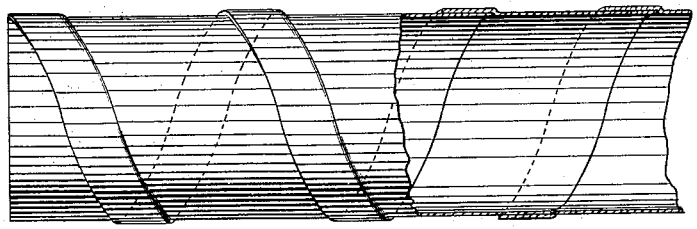
WITNESSES:
INVENTOR
John B. Root
BY
ATTORNEY

UNITED STATES PATENT OFFICE.

JOHN B. ROOT, OF PORT CHESTER, NEW YORK; HANNAH M. ROOT ADMINISTRATRIX, AND WILLIAM S. CHURCH ADMINISTRATOR, OF SAID JOHN B. ROOT, DECEASED.

SPIRALLY-WELDED TUBE.

SPECIFICATION forming part of Letters Patent No. 376,680, dated January 17, 1888.

Application filed September 19, 1881. Serial No. 42,275. (No model.) Patented in England August 3, 1886, No. 9,951, and in Canada August 9, 1887, No. 27,382.

*To all whom it may concern:*

Be it known that I, JOHN B. ROOT, a citizen of the United States, residing at Port Chester, in the county of Westchester and State of New York, have invented certain new and useful Improvements in Metal Pipes or Tubes, (for which Letters Patent have been granted in Great Britain, numbered 9,951, dated August 3, 1886, and in the Dominion of Canada, numbered 27,382, dated August 9, 1887,) of which the following is a specification.

This invention relates in a general way to that class of metal pipes made of a spirally-wound strip or ribbon, the seam or joint formed by the union of the opposite edges of said strip running around the pipe in a spiral direction.

Pipes of this character have been heretofore made with interlocking edges, so as to form what is known in the art as an "interlocking seam," making a spiral rib, standing out on the surface of the pipe. They have also been made with their opposite edges simply overlapping each other and riveted together, as fully illustrated in my Letters Patent No. 188,305, of March 13, 1877. Such pipes, however, do not come within the purview of my present invention, and are distinguished therefrom by the fact that in them the seam or joint is simply riveted or similarly re-enforced, while the pipe which I have in view is one in which there is a welded joint or seam—an article manifestly very much more desirable than and superior to those just referred to. Tubes—such, for instance, as gun-barrels—have before been made by simply bringing the plain edges of a spirally-wound blank in contact, and then welding them together to form what is known as a "butt-welded" joint or seam, the article as a whole being, in this operation, brought to welding heat and manipulated and worked as one piece. Such a process is not in any sense applicable to what I have in view.

It has further been proposed to manufacture pipe by scarfing the edges of a blank, and afterward spirally winding the same and welding together its scarfed edges, and also by rolling the blanks with symmetrical tongues and grooves on the opposite side edges, formed so as to interlock in the winding, and then closing the interlocked seam or joint by welding, soldering, or otherwise. Both of these schemes, however, have proved to be impracticable, because they have involved, among other things, the heating of the blank throughout its whole extent to a temperature requisite to effect the welding of the edges. This softens, makes porous, and seriously weakens the metal, and the surface of the metal becomes scaly and rough and liable to oxidation. It also brings the blank itself into a condition in which, under the strain and manipulation it is subjected to during the coiling and welding operation, it becomes distorted and so unfit for use. The body of the strip (that is to say, the part between the edges of the strip) almost invariably collapses in the heating-furnace, and under the action of the welding mechanism it becomes misshapen and improperly stretched, so that it is impossible to make from it symmetrical pipe. In order to produce pipe having a welded spiral seam, I have found it to be essential that the body of the strip or blank should, in the finished pipe, be to all intents and purposes intact, or in the same condition in which it was in the original strip or blank—a condition which disappears when it is once subjected to the heat referred to.

The improved tubing in which my invention is comprised consists of a spirally-wound metal blank or strip heated to a welding temperature along its edges only, these edges overlapping and being welded together, the body or portion of the strip between these edges being unsubjected to and unaffected by the heat, and remaining in the same condition in the pipe as in the strip or blank—that is to say, not having undergone the undesirable change which would have taken place in it had it also have been heated to welding temperature. The body of the tube or pipe thus preserves the same quality, finish, stiffness, and tensile strength which it possessed in the strip. The metal composing the spiral seam is softened and weakened to some extent by the heat; but the seam itself, by reason of the double thickness of metal of which it is composed, and especially its spiral direction in the pipe by which it will sustain a much greater internal strain or pressure than if it were longitudinal, is fully as strong as or stronger than the unweakened main portion or body of the pipe.

In the accompanying drawing I have shown a section of one form of my improved pipe, a portion of the same being broken away to better illustrate the structure.

In the manufacture of this tubing one or both of the edges are offset or stretched in such manner as will preserve the cylindrical form of the pipe as the winding progresses, and so as to overcome the tendency of the blank to assume a conical rather than a cylindrical form—a tendency readily overcome when the body of the blank remains in its normal or unheated condition, but which would render practically impossible the forming of symmetrical pipe if the blank were heated throughout its breadth.

A practical mechanism for forming this tubing is illustrated in a patent granted to me July 3, 1883, No. 280,403, on an application filed September 10, 1881. This consists, essentially, of means for coiling the blank in spiral form with its opposite edges overlapping, of a heating jet or jets for heating such overlapping edges just before and as they approach each other, and of welding devices located upon opposite sides of the blank and adapted to weld them together as they are fed forward from the welding flame. This mechanism is capable of adjustment, in order to adapt it to pipes of various sizes and blanks of different thicknesses. The separate strips composing the blank are welded together end to end preliminarily to being fed into the machine, so that any length of finished pipe may be produced.

Pipe having the characteristics above set forth is superior to any similar article heretofore made as a product for the market. Its joint portion is as strong as its body part, and therefore, for a given purpose, it is only necessary to provide the blank of proper thickness and durability, whereas with the common longitudinally-welded pipe, the seam being the weakest part, it is requisite to provide a blank of excessive weight and thickness, in order to insure the proper strength of seam. Thus my improved article is very much cheaper, since I am enabled to save very materially in the amount of metal that enters into its structure. This article of pipe can also be produced from metal thinner than has heretofore been used for making commercial welded pipe of any kind, which permits a great improvement in that class of pipe or tubing at a material reduction in the cost of producing the same.

Having now described my improvement and the best way known to me of carrying the same into effect, what I claim herein as new and of my own invention is—

As a new article of manufacture, the described spirally-seamed metal pipe or tubing, consisting of a spirally-wound strip or blank having its opposite edges united by a welded lap-seam, in the formation of which seam the overlapping edges only of the blank have been heated to welding temperature, the body or main portion of the pipe being composed of metal unsubjected to and unaffected by said welding heat, and in the same condition in the pipe as it was in the strip, substantially as and for the purposes hereinbefore set forth.

JOHN B. ROOT.

Witnesses:
SAML. A. DUNCAN,
A. B. JONES.